(12) United States Patent
Moulin

(10) Patent No.: US 8,943,672 B2
(45) Date of Patent: Feb. 3, 2015

(54) MOULDING AND FITTING-TOGETHER SYSTEM

(75) Inventor: Jacky Moulin, Sainte Marie Laumont (FR)

(73) Assignee: Moulindustrie, Sainte Marie Laumont (FR)

( * ) Notice: Subject to any disclaimer, the term of this patent is extended or adjusted under 35 U.S.C. 154(b) by 587 days.

(21) Appl. No.: 13/303,808

(22) Filed: Nov. 23, 2011

(65) Prior Publication Data

US 2012/0131780 A1 May 31, 2012

(30) Foreign Application Priority Data

Nov. 29, 2010 (FR) .................................... 10 59846

(51) Int. Cl.
| | |
|---|---|
| B23P 21/00 | (2006.01) |
| B29C 69/00 | (2006.01) |
| B29C 45/04 | (2006.01) |
| B29L 31/56 | (2006.01) |
| B29C 45/00 | (2006.01) |

(52) U.S. Cl.
CPC .............. *B29C 45/006* (2013.01); *B23P 21/00* (2013.01); *B29C 69/004* (2013.01); *B29C 2045/0063* (2013.01); *B29L 2031/565* (2013.01)
USPC .............. 29/564.1; 29/33 K; 29/65; 425/588; 425/556

(58) Field of Classification Search
CPC ................................................ B29C 2045/0063
USPC ........................................ 29/564.1, 65, 33 K
See application file for complete search history.

(56) References Cited

U.S. PATENT DOCUMENTS

| | | | | |
|---|---|---|---|---|
| 4,340,352 | A * | 7/1982 | Hayberg | 29/453 |
| 5,378,422 | A * | 1/1995 | Musiel et al. | 264/238 |
| 7,874,830 | B2 * | 1/2011 | Moulin | 425/317 |
| 8,672,668 | B2 * | 3/2014 | Armbruster | 425/556 |
| 8,827,678 | B2 * | 9/2014 | Moulin | 425/161 |
| 2007/0212440 | A1 * | 9/2007 | Iimura et al. | 425/517 |
| 2011/0293769 | A1 * | 12/2011 | Moulin | 425/161 |

FOREIGN PATENT DOCUMENTS

| | | |
|---|---|---|
| EP | 1649998 A1 * | 4/2006 |
| FR | 2939710 | 6/2010 |
| WO | WO 2010/128072 | 11/2010 |

OTHER PUBLICATIONS

Search Report for FR 10/59846 dated Sep. 6, 2011.
Written Opinion for FR 10/59846 dated Nov. 29, 2010.

* cited by examiner

*Primary Examiner* — Erica E Cadugan
(74) *Attorney, Agent, or Firm* — Nixon & Vanderhye, PC

(57) ABSTRACT

A system for molding and fitting together a first part and a second part. Two guide rails are parallel to a first direction and, for each guide rail, a carriage moves in translation on the guide rail. For each carriage, a cam carrier moves in translation parallel to the first direction and has a cam, the two ends of which are distant in a fitting-together direction. An assembly bar carries a series of first cavities, each end of which is mounted in one of the two cams. A series of second cavities are provided. An activation device moves the cam carriers and, for each carriage, a locking device locks the carriage alternatively with the cam carrier and the guide rail.

7 Claims, 5 Drawing Sheets

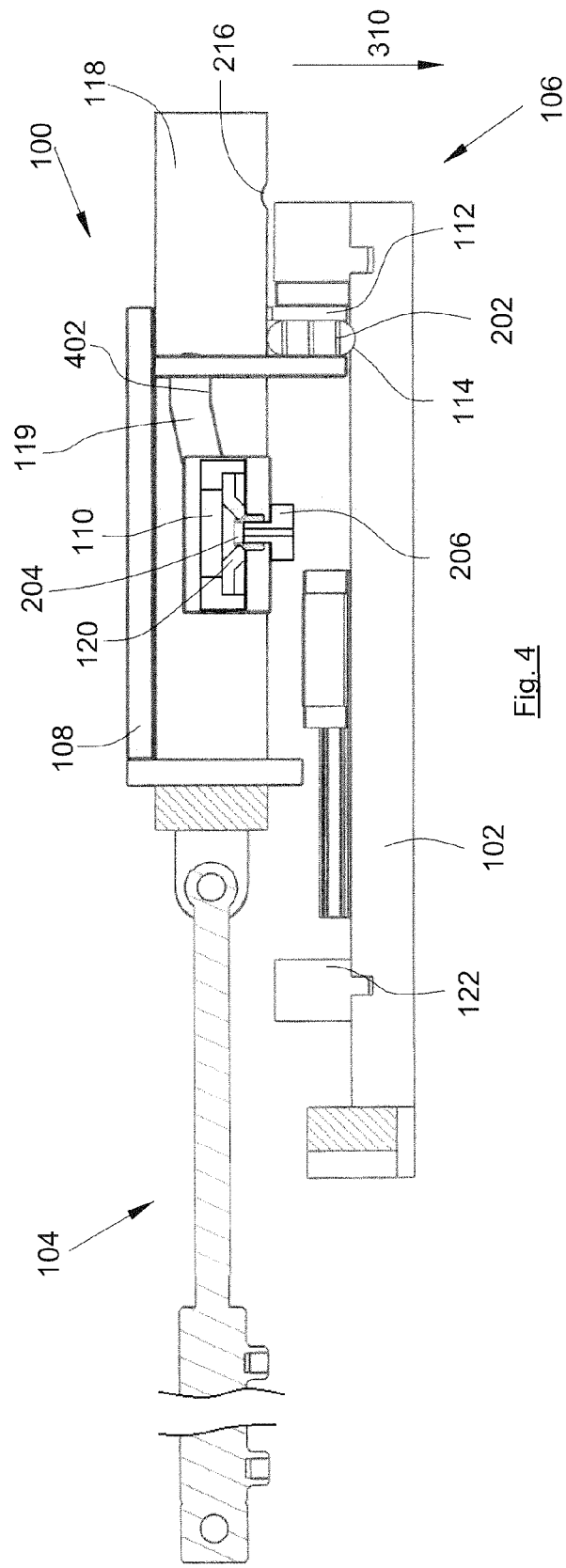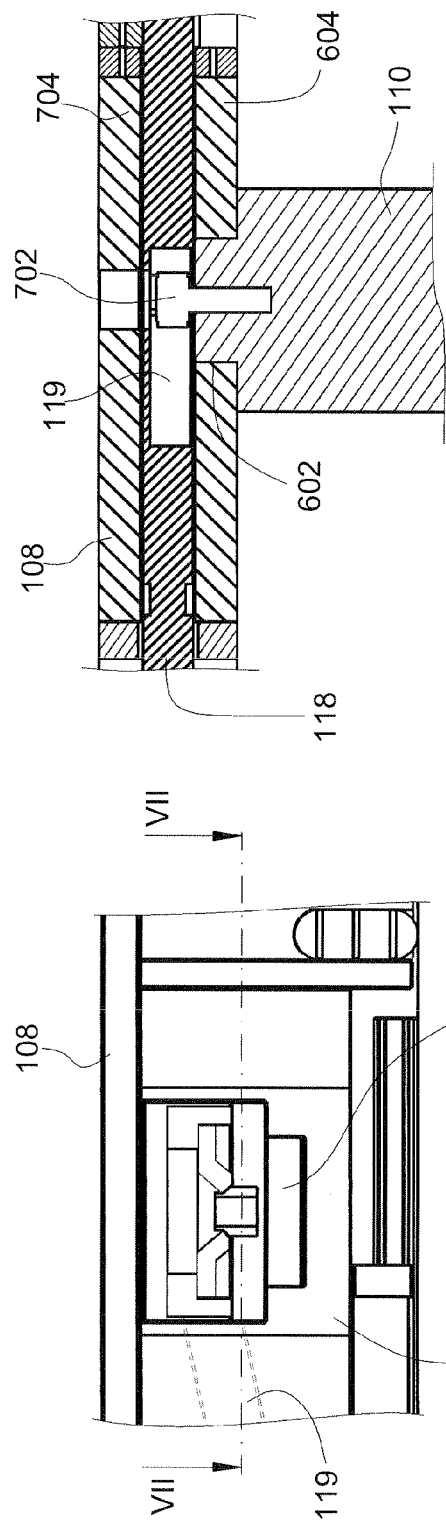

FIG. 8

Embodiment Wherein The Assembly Bar 110 Carries Several First Cavities 120 Associated with the Same Number of Second Cavities 116

FIG. 9

Embodiment Wherein the First Parts Moulded in the First Cavities on the Assembly Bar are Bodies of a Cap, and Wherein the Second Parts Moulded in the Second Cavities are Lids of a Cap

MOULDING AND FITTING-TOGETHER SYSTEM

The present invention concerns a system for moulding and fitting together two parts.

A cap of the type consisting of a cap for a bottle containing a liquid product such as shampoo, conditioner, washing-up product or the like, generally comprises a body and a lid. The body is intended to fit on the bottle and the lid is intended to be maneuvered from a closed position to an open position or vice versa to enable the product to be retained in the bottle or to enable it to flow out of the bottle.

Such caps can also be used in other sectors such as for example motor vehicles or in the medical field.

The production of such a cap comprises a step of moulding the body and a step of moulding the lid. The body and lid are then directed to a fitting station where a body and lid are fitted one in the other before being fixed to the neck of a bottle.

Producing a component consisting of two fitted-together moulded parts, such as for example a cap, requires a station for moulding a first part (the lid), a station for moulding a second part (the body) and a station for fitting together the first part and the second part. The financial cost of such stations is often high and the increase in the number of steps increases the manufacturing time.

One object of the present invention is to propose a system for moulding and fitting together two parts that does not have the drawbacks of the prior art.

For this purpose, a system for moulding and fitting together a first part and a second part, for example of the cap lid and body type, is proposed, the moulding and fitting-together system comprising:

two guide rails extending parallel to a first direction,
for each guide rail, a carriage mounted so as to be able to move in translation on the guide rail,
for each carriage, a cam carrier able to move in translation with respect to the said carriage parallel to the first direction and having a cam, the two ends of which are distant from each other in a fitting-together direction perpendicular to the said first direction,
an assembly bar carrying a series of first cavities, each first cavity being intended to mould one of the first parts, each end of the assembly bar being mounted in one of the two cams,
a series of second cavities, each second cavity being intended to mould one of the second parts,
an activation device designed to move the cam carriers, and
for each carriage, a locking device designed to lock the said carriage alternately with the cam carrier and the guide rail,
the assembly bar being firstly able to move in translation parallel to the first direction between a first position in which the first series of cavities is not opposite the series of second cavities and a second position in which the first series of cavities is opposite the series of second cavities, and secondly, from the second position, able to move in translation parallel to the fitting-together direction, between a distant position in which the first part and the second part are not fitted together and a fitting-together position in which the first part and the second part are fitted together.

Advantageously, the moulding and fitting-together system comprises blocking means designed to block the translation of the assembly bar with respect to each carriage in the first direction.

Advantageously, each carriage has an internal wall disposed between the cam of the said carriage and the other carriage, and the blocking means consist of a window produced in each internal wall and the edges of which parallel to the fitting-together direction are in abutment against flanks of the assembly bar.

Advantageously, the locking device comprises a latch, a first locking groove produced on the cam carrier and a second locking groove produced on the guide rail, and the latch is designed to engage alternately in the first locking groove or the second locking groove.

Advantageously, the latch takes the form of an oblong element, when a first end with a radius cooperates with the first locking groove, the second end with a radius is in abutment on a surface of the guide rail, and, when the second end with a radius cooperates with the second locking groove, the first end with a radius is in abutment on a surface of the cam carrier.

Advantageously, the first parts or the second parts are lids of a cap and, respectively, the second parts or the first parts are bodies of the cap.

Advantageously, the cam has a horizontal part at its end corresponding to the distant position.

The features of the invention mentioned above, as well as others, will emerge more clearly from a reading of the following description of an example embodiment, the said description being given in relation to the accompanying drawings, among which:

FIG. 1 shows a system for moulding and fitting together two parts according to the invention after removal of part of the carriage, FIGS. 2 to 4 show the various operating steps of the system for moulding and fitting together two parts according to the invention, FIG. 5 shows an embodiment of moulding cavities for a moulding and fitting-together system according to the invention, FIG. 6 is a detail of the moulding and fitting-together system with the complete carriage, and FIG. 7 is a section along the line VII-VII in FIG. 6.

FIG. 8 is a schematic representation of a further embodiment of the invention.

FIG. 9 is a schematic representation of yet a further embodiment of the invention.

The invention will be more particularly described in the case of a cap consisting of a body and a lid.

Figure 1:
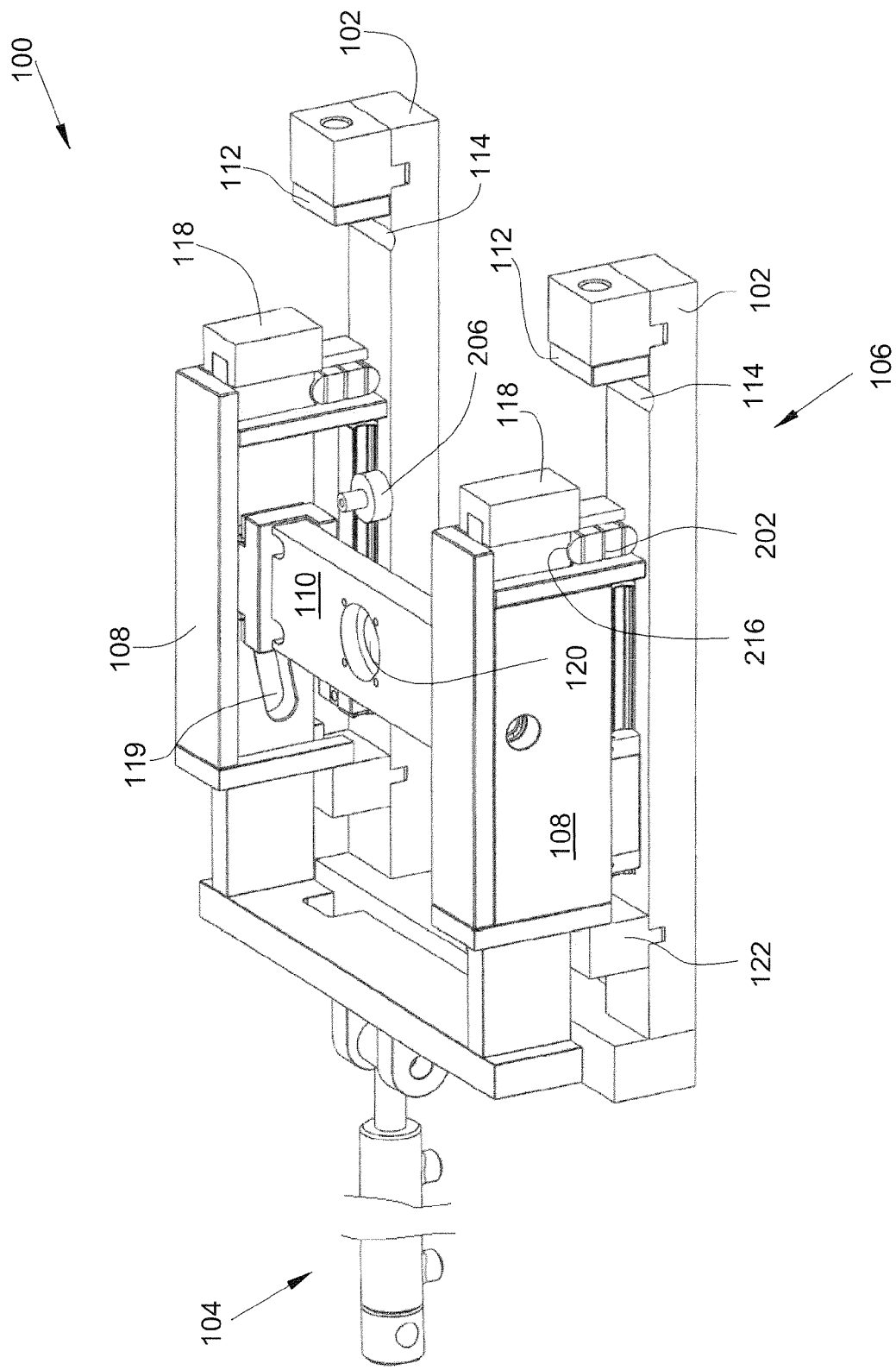

FIG. 1 shows a system 100 for moulding and fitting together a first part 204 and a second part 206, such as for example a lid 204 (FIG. 2) and a body (206) of a cap.

The moulding and fitting-together system 100 comprises a base consisting mainly of two parallel guide rails 102 that define a first direction, which is here horizontal.

Each guide rail 102 is mounted here on a chassis that connects the moulding and fitting-together system 100 with an injection press and mould assembly.

For each guide rail 102, the moulding and fitting-together system 100 comprises a carriage 108. Each carriage 108 is able to move in translation along the guide rail 102 in question between a downstream stop 122 and an upstream stop 112. Each carriage 108 is guided in translation on the guide rail 102 in question by all appropriate devices and the stops 112 and 122 are disposed so as to allow the movement of each carriage 108 over a suitable distance, as will be understood better hereinafter.

The two rails 102 define a movement plane in which the carriages 108 move. The movement plane is here the horizontal plane.

The moulding and fitting-together system 100 comprises, for each carriage 108, a cam carrier 118 having a cam 119.

Each cam 119 is contained in a fitting-together plane that is parallel to the first direction and perpendicular to the movement plane. The fitting-together plane is here vertical.

Each cam 119 has two ends that are distant from each other in the first direction and distant from each other in a fitting-together direction contained in the fitting-together plane and perpendicular to the first direction. Here the fitting-together direction is vertical.

Thus, each cam 119 has a difference in level that is here a descending slope going from the upstream stop 112 towards the downstream stop 122. The two cam carriers 118 are disposed so that the cams 119 face each other.

For reasons of clarity, and to make it possible to see the cam 119, part of the carriage 108 has been removed. This part is seen in FIGS. 6 and 7.

Figure 2:
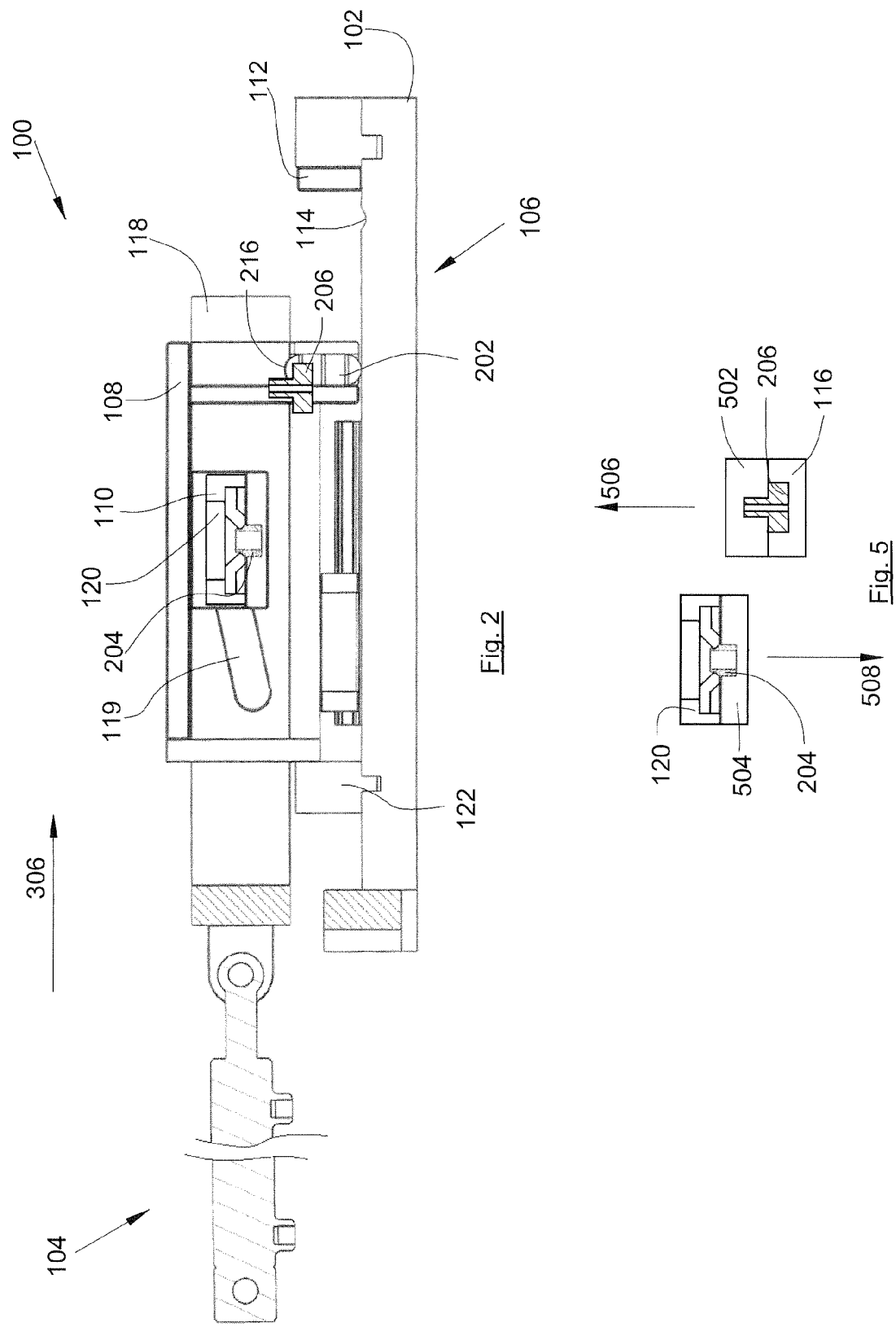
Figure 3:
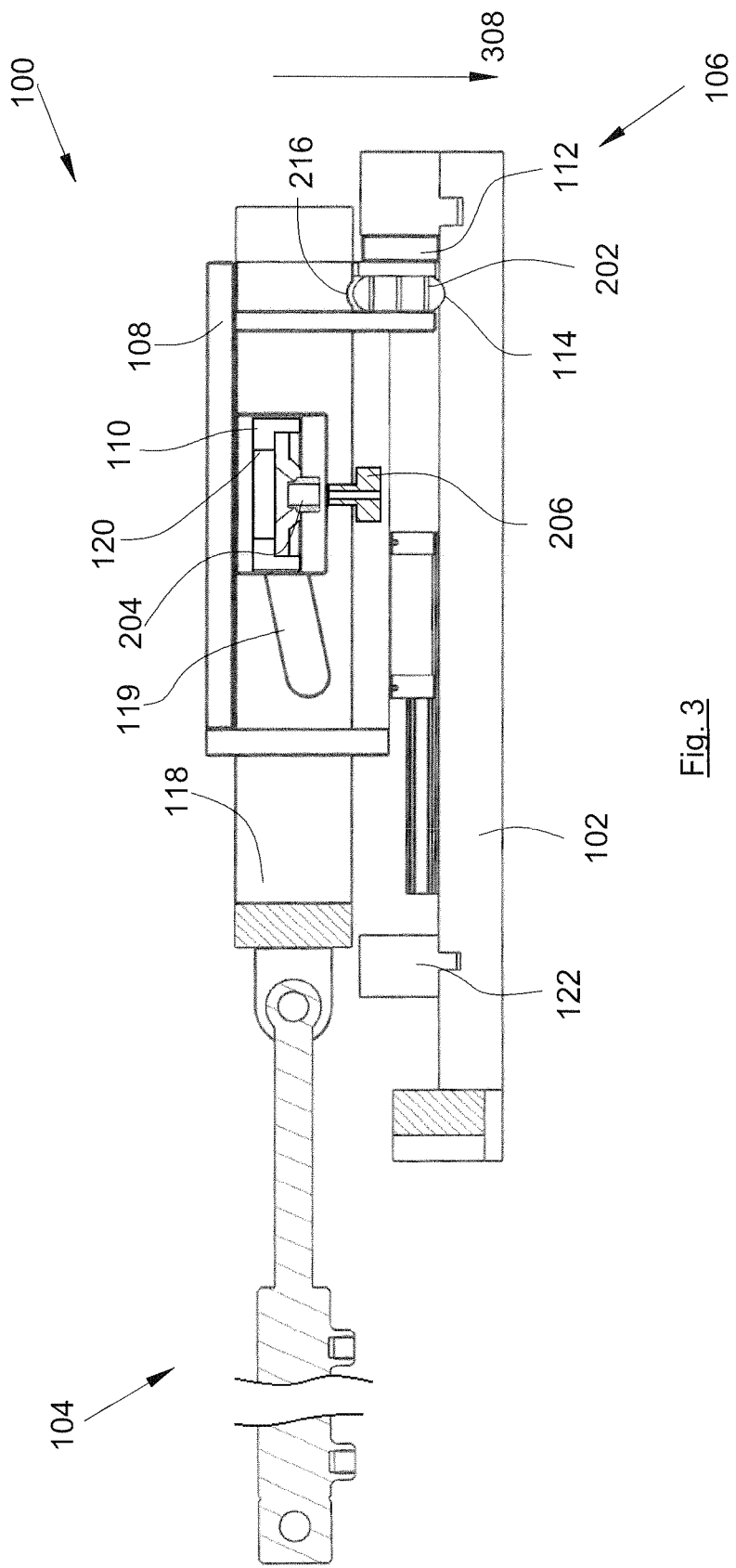

As can be seen better in FIGS. 2 to 4, which show the various operating steps of the moulding and fitting-together system 100, which is here in cross-section, the cam 119 therefore has here a positive slope going from the downstream stop 122 towards the upstream stop 112.

Each cam carrier 118 is mounted so as to slide on the corresponding carriage 108 parallel to the first direction (arrow 306). The cam carrier 118 slides parallel to the first direction inside the carriage 108 through a groove that passes through the latter.

The moulding and fitting-together system 100 comprises an assembly bar 110 that takes the form of a straight beam that extends between the cam carriers 118 perpendicular to the fitting-together plane, that is to say here horizontally. Each end of the assembly bar 110 is provided with a shaft (702, FIG. 7) that is here cylindrical and is mounted in one of the two cams 119, and thus the assembly bar 110 can follow the shape of the cams 119.

FIG. 6 shows a detail equivalent to FIG. 2, in which the carriage 108 is complete and FIG. 7 is a cross section of FIG. 6.

The moulding and fitting-together system 100 comprises blocking means 602 that are provided for blocking the translation of the assembly bar 110 in the first direction with respect to each carriage 108, that is to say here the horizontal direction, while leaving free the translation in the fitting-together direction. Thus, with respect to the carriages 108, the assembly bar 110 is solely able to move in translation in the fitting-together direction, that is to say vertically.

In the embodiment of the invention presented in the figures, the cam carrier 118 is disposed between an external wall 704 and an internal wall 604 of the carriage 108, which are parallel to the fitting-together plane. The internal walls 604 of each carriage 108 face each other and constitute the removed parts in FIGS. 1 to 4.

Each internal wall 604 is therefore disposed between the cam 119 of the carriage 108 in question and the other carriage 108.

The blocking means 602 consist here of a window 602 produced in each internal wall 604 and the edges of which, parallel to the fitting-together direction, are in abutment against the flanks of the assembly bar 110.

Thus the assembly bar 110 cannot move in the first direction independently of the carriages 108 and can move only in the fitting-together direction with respect to the carriages 108.

The assembly bar 110 carries a series of first moulding cavities 120, each of which is intended to mould a lid 204.

The moulding and fitting-together system 100 comprises a series of second moulding cavities 116 disposed between the two carriages 108, each of the second cavities 116 being intended to mould the body 206. For each cap, a first cavity 120 is associated with a second cavity 116. In the embodiment in FIGS. 1-7, there is a single first cavity 120 and a single second cavity 116, but it is possible to provide for the assembly bar 110 to carry several first cavities 120 associated with the same number of second cavities 116, as schematically shown in FIG. 8.

The moulding and fitting-together system 100 also comprises an activation device 104 that is designed to act on the cam carriers 118 so as to move them in one direction or in the other parallel to the first direction.

The moulding and fitting-together system 100 also comprises, for each carriage 108, a locking device 106 designed to lock the carriage 108 alternately with the cam carrier 118 and the guide rail 102.

When the locking device 106 locks the carriage 108 with the cam carrier 118, they are secured together and move together along the rail 102. When the locking device 106 locks the carriage 108 with the guide rail 102, they are linked and the carriage 108 remains immobile while the cam carrier 118 can continue to move freely in the carriage 108 parallel to the rail 102.

FIG. 2 shows the moulding and fitting-together system 100, where the assembly bar 110 is in a first position, in which the carriage 108 is in abutment against the downstream stop 122 and in which the first series of cavities 120 is not opposite the series of second cavities 116.

FIG. 3 shows the moulding and fitting-together system 100, where the assembly bar 110 is in a second position, in which the carriage 108 is in abutment against the upstream stop 112 and in which the first series of cavities 120 is opposite the series of second cavities 116 and at a distance from these. This position corresponds to a distant position.

Between the first position and the second position, the assembly bar 110 moves in translation parallel to the first direction.

FIG. 4 shows the moulding and fitting-together system 100 in a position of fitting the first piece 204 on the second piece 206. That is to say, as from the second position, the assembly bar 110 is able to move in translation parallel to the fitting-together direction between the distant position and the fitting-together position.

As from the downstream stop 122, the locking device 106 locks the carriage 108 with the cam carrier 118 in order to secure them together. The activation device 104 drives each cam carrier 118 in translation parallel to the first direction (FIG. 2).

When the carriages 108 come into abutment against the upstream stops 112, each locking device 106 locks a carriage 108 with the corresponding rail 102, which blocks the translation of the said carriage 108 (FIG. 3).

The activation device 104 continues to drive each cam carrier 118 in translation parallel to the first direction (FIG. 4). Because of this the cam 119 moves with respect to the assembly bar 110, which then follows the descending slope of the cam 119 in order to come into the fitting-together position. Because of the blocking means 602 that block the translation of the assembly bar 110 in the first direction, the latter can move only in the fitting-together direction.

The assembly bar 110 is forced to follow the cam 119 and can move only in the fitting-together direction, which is here the vertical direction.

The activation device 104 here consists of a ram, which may be pneumatic, hydraulic or electric, and of a twin-arm stirrup. Each arm is secured to one of the cam carriers 118 while the ram 104 acts on the stirrup.

Each assembly bar 110 is therefore subjected to a translation movement in the first direction corresponding to the direction parallel to the rails 102 and to a translation movement in the fitting-together direction.

Each locking device 106 comprises a latch 202 secured to a carriage 108, a first locking groove 216 produced on the cam carrier 118 and a second locking groove 114 produced in the guide rail 102. The latch 202 engages alternately in the first locking groove 216 and in the second locking groove 114, so as to lock the carriage 108 alternately with the cam carrier 118 and the guide rail 102.

The latch 202 takes the form of an oblong element, each end with a radius of which cooperates with one of the locking grooves 114, 216. When a first end with a radius cooperates with the first locking groove 216, the second end with a radius slides over a surface of the guide rail 102. When the second end with a radius cooperates with the second locking groove 114, the first end with a radius slides over a surface of the cam carrier 118.

In FIG. 2, the latch 202 is locked with the first locking groove 216 by abutment of the second end with a radius on the surface of the guide rail 102, the cam carrier 118 and the carriage 108 move in translation on the guide rail 102 (arrow 306) and come into abutment against the upstream stop 112 (FIG. 3). Each first cavity 120 that carries a lid 204 and each assembly bar 110 follow the carriage 108. The assembly bar 110 then reaches the second position, that is to say the position in which the lid 204 is opposite the body 206.

During the step shown in FIG. 3, the latch 202 unlocks from the first locking groove 216 and locks with the second locking groove 114 (arrow 308) by abutment of the first end with a radius on the surface of the cam carrier 118.

During the step shown in FIG. 4, the latch 202 is unlocked from the first locking groove 216, and the cam carrier 118 continues to advance. As the latch 202 is locked with the second locking groove 114, the carriage 108 remains immobile. The continuation of the movement of the cam carrier 118 causes the movement in the fitting-together direction of the assembly bar 110 in the cams 119 and therefore moves the lid 204 closer to the body 206.

The return to the position in FIG. 2 takes place by movement of the cam carriers 118 in the opposite direction.

After the fitting together of the lid 204 and body 206, this assembly is ejected. The cam carriers 118 are next driven in translation in the direction opposite to the direction of the arrow 306, which enables the assembly bar 110 to return to its distant position in the cams 119 (FIG. 3). The continuation of the movement of the cam carriers 118 causes the locking of the latch 202 with the first locking groove 216 and therefore the conjoint movement of the cam carriers 118 and carriages 108 for return as far as the downstream stop 122.

A new cycle of injection/moulding, fitting together and ejection can take place.

The implementation of the moulding and fitting-together system 10 is particularly simple and its operation is easy to manage since there is only one element to be controlled, which is here the ram 104.

To facilitate the holding in position of the assembly bar 110 during the movement of the carriages 108 between the downstream stops 122 and the upstream stops 112, each cam 119 has, at its end corresponding to the distant end, a horizontal part 402. In the embodiment of the invention in the figures, the horizontal part is the upper part of the cam 119.

FIG. 5 shows an embodiment of the cavities for moulding a cap.

The lid 204 is produced from the first cavity 120, which shapes the top part of the lid 204, and another cavity, referred to as the third cavity 504, which shapes the lower part of the lid 204, that is to say the part that will subsequently fit on the body 206.

The body 206 is moulded from the second moulding cavity 116, which moulds the lower part of the body 206, that is to say the part that is intended to fit subsequently on a bottle, and another cavity, referred to as the fourth cavity 502, which moulds the upper part of the body 206, on which the lid 204 fits.

The series of first cavities 120 is the series that is carried by the assembly bar 110. The series of third cavities 504 and the series of fourth cavities 502 are disposed on movable assemblies.

The four cavities 120, 116, 502 and 504 are associated with the injection press, which supplies them with moulding material.

After the moulding of the caps, each third cavity 504 and each fourth cavity 502 are moved by their movable assembly respectively in the direction of the arrow 508 and of the arrow 506 so as to leave clear the areas where the fitting together will take place.

FIG. 2 shows the moulding and fitting-together system 100 after the moulding of the bodies 206 and caps 204 and after release of the third cavities 504 and fourth cavities 502.

After the moulding of the caps 204, 206 and the release of the third cavity 504 and of the fourth cavity 502, the method of fitting together the body 206 and lid 204 comprises:
- a step of movement in translation in the first direction of the cam carriers 118 and carriages 108 as well as the first cavities 120 that are linked thereto as far as the second position (distant position),
- a step of stopping the movement when the first cavities 120 are correctly positioned, that is to say when each first cavity 120 is opposite the associated second cavity 116, this position corresponding to the carriages 108 being put in abutment against the upstream stops 112,
- a step of movement of the cam carriers 118 in translation in the first direction,
- a step of moving the assembly bar 110 in the cams 119 so that the body 206 and the cap 204 fit together,
- a step of movement in translation, first of the cam carriers 118, then the cam carriers 118 and carriages 108, as well as the first cavities 120, in a direction opposite to the first movement step, and
- a step of stopping the movement when the carriages 108 are in abutment against the downstream stops 122.

Each cap thus produced can then be ejected from the second cavity 116.

Naturally, the present invention is not limited to the examples and embodiments described and shown, but is capable of numerous variants accessible to persons skilled in the art.

For example, the invention has been described particularly in the case of a cap but applies in the same way to any element comprising two moulded parts that are to be assembled together, and in particular the invention applies in the same way if the position of the body and the position of the lid are reversed, such as is shown schematically in FIG. 9.

For example, it is possible to provide for the cams to have reverse slopes if the first part is disposed under the second part at the time of fitting together. The second part 206 must then be situated at a greater height than that of the first part 204 at the time of moulding.

The invention claimed is:

1. System for moulding and fitting together a first part and a second part, the moulding and fitting-together system comprising:

two guide rails each having a longitudinal axis extending parallel to a first direction, for each of the guide rails, a respective carriage mounted so as to be able to move in translation on the respective guide rail, for each of the carriages, a respective cam carrier able to move in translation with respect to the said respective carriage parallel to the first direction, each of the cam carriers having a respective cam, wherein two ends of each respective cam are distant from each other in a fitting-together direction perpendicular to the said first direction, an assembly bar carrying a series of first cavities, each of the first cavities being intended to mould a respective one of the first parts, one end of the assembly bar being mounted in one of the two cams, and an opposite end of the assembly bar being mounted in the other of the two cams, a series of second cavities, each of the second cavities being intended to mould a respective one of the second parts, an activation device designed to move the cam carriers, and for each of the carriages, a respective locking device designed to lock the said respective carriage alternately with the respective cam carrier and the respective guide rail, the assembly bar being firstly able to move in translation parallel to the first direction between a first position in which the first series of cavities is not in alignment along the fitting together direction with the series of second cavities and a second position in which the first series of cavities is in alignment along the fitting together direction with the series of second cavities, and secondly, from the second position, able to move in translation parallel to the fitting-together direction, between a distant position in which the first parts and the second parts are not fitted together and a fitting-together position in which the first parts and the second parts are fitted together.

2. Moulding and fitting-together system according to claim 1, further comprising blocking means designed to block the translation of the assembly bar with respect to each of the carriages in the first direction.

3. Moulding and fitting-together system according to claim 2, wherein each of the carriages has a respective internal wall disposed between the respective cam of the said respective carriage and the other carriage, and wherein the blocking means consist of a window produced in each of the internal walls and edges of which, parallel to the fitting-together direction, are in abutment against flanks of the assembly bar.

4. Moulding and fitting-together system according to claim 1, wherein each of the locking devices comprises a respective latch, a respective first locking groove produced on the respective cam carrier, and a respective second locking groove produced on the respective guide rail, and wherein the respective latch is designed to engage alternately in the respective first locking groove or the respective second locking groove.

5. Moulding and fitting-together system according to claim 4, wherein each of the latches takes the form of a respective oblong element having a respective first end with a respective first radius and a second end with a respective second radius, wherein, when the respective first end with the respective first radius cooperates with the respective first locking groove, the respective second end with the respective second radius is in abutment with a surface of the respective guide rail, and wherein, when the respective second end with the respective second radius cooperates with the respective second locking groove, the respective first end with the respective second radius is in abutment with a surface of the respective cam carrier.

6. Moulding and fitting-together system according to claim 1, wherein the first parts or the second parts are lids of a cap and wherein, respectively, the second parts or the first parts are bodies of the cap.

7. Moulding and fitting-together system according to claim 1, wherein each of the cams has, at a respective end thereof that is operatively engaged by the assembly bar when the assembly bar is in the distant position, a horizontal part.

* * * * *